United States Patent [19]

Wiens

[11] Patent Number: 4,515,576

[45] Date of Patent: May 7, 1985

[54] VARIABLE SPEED TRANSMISSION

[76] Inventor: William S. Wiens, 5508 Bent Tree Dr., Dallas, Tex. 75248

[21] Appl. No.: 583,797

[22] Filed: Mar. 1, 1984

Related U.S. Application Data

[63] Continuation of Ser. No. 234,436, Feb. 13, 1981, abandoned.

[51] Int. Cl.³ ............................................. F16H 9/18
[52] U.S. Cl. ..................................... 474/29; 474/37; 474/149
[58] Field of Search ................... 474/29, 37, 149, 128, 474/129; 74/422

[56] References Cited

U.S. PATENT DOCUMENTS

| | | | |
|---|---|---|---|
| 510,283 | 12/1893 | McIntyre | 474/29 |
| 562,234 | 6/1896 | McIntyre | 474/25 |
| 641,281 | 1/1900 | Edison et al. | 474/25 |
| 795,386 | 7/1905 | Cutter | 256/42 |
| 803,811 | 11/1905 | Cutter | 474/37 |
| 1,476,603 | 12/1923 | Firminger | 474/245 |
| 1,813,011 | 7/1931 | Adams | 474/149 |
| 2,154,648 | 4/1939 | Weston | 474/149 |
| 2,482,326 | 9/1949 | Davis | 474/149 |
| 2,799,176 | 7/1957 | Rieser | 474/30 |
| 2,970,493 | 2/1961 | Rieser | 474/30 |
| 3,214,997 | 11/1965 | Rieser | 74/640 |
| 3,287,988 | 11/1966 | Heyer | 474/19 |
| 3,924,480 | 12/1975 | Carapellucci | 74/689 |
| 4,056,015 | 11/1977 | Ludoph et al. | 474/28 |
| 4,080,841 | 3/1978 | Vollers | 474/201 |
| 4,094,203 | 6/1978 | van Deursen et al. | 474/28 |
| 4,099,737 | 6/1978 | Waugh | 280/261 |
| 4,125,037 | 11/1978 | Palmer et al. | 74/732 |
| 4,143,558 | 3/1979 | van Deursen et al. | 474/28 |
| 4,152,947 | 5/1979 | van Deursen et al. | 474/11 |
| 4,164,134 | 8/1979 | Vollers | 72/183 |

OTHER PUBLICATIONS

Transmission Impossible?, Jan P. Norbye, Feb. 1977.
A Gearless Gasoline Saver, Business Week, Feb. 18, 1980.
Material from the Catalog of Cottingham Bearing Corporation entitled "Link-Belt; Silent Chain Drivers: Service Instructions".
21st-Century Car, Jan P. Norbye (undated).

*Primary Examiner*—James A. Leppink
*Assistant Examiner*—Frank H. McKenzie, Jr.
*Attorney, Agent, or Firm*—Richards, Harris, Medlock & Andrews

[57] ABSTRACT

A variable speed transmission (20) includes a sprocket (46) mounted on a first shaft (22) for rotation therewith. A variable effective diameter pulley (30) is mounted for rotation on a driven shaft (32). The pulley includes a pair of pulley halves (80, 82) having opposed inclined belt engaging surfaces (84, 86) and splines (90, 94) extending from the pulley halves. The splines are intermeshed so that the pulley halves may be drawn together or separated while rotating as a unit. A split shaft (130), including two half shafts (132, 134), extend within the pulley halves. Each half shaft engages one of the pulley halves such that as the half shafts are moved relative to one another, the pulley halves are moved one relative to the other. A pulley control mechanism (66) is provided for moving the halves of the split shaft simultaneously such that the center line of the pulley remains fixed as the pulley halves move together or apart. An endless chain assembly (60) is mounted around the gear and variable effective diameter pulley arrangement to transmit rotation therebetween. The belt includes edge portions (234) for engaging the pulley and an intermediate portion (230) for engaging the sprocket (46). An idler pulley (50) is controlled by an idler tensioner actuation mechanism (52) to maintain tension on the belt as the effective diameter of the pulley is varied.

24 Claims, 16 Drawing Figures

VARIABLE SPEED TRANSMISSION

This application is a continuation of application Ser. No. 234,436, filed Feb. 13, 1981, now abandoned.

TECHNICAL FIELD

The present invention relates to a variable speed transmission and more specifically to a variable speed transmission permitting continuous transmission gear changes.

BACKGROUND ART

Variable speed transmissions which permit the selection of any drive ratio offer the prospect of better efficiency by permitting a closer match between the most efficient engine speed with a given vehicle speed. Although providing this advantage, prior art transmissions designed to provide a variable ratio range have encountered substantial difficulties in the area of noise, premature wear and power handling limitations. In prior art belt drive variable transmission systems, slippage problems between the belt and the pulleys may be encountered under power. In the prior art units, slippage occurs at lower gear ratios, thus resulting in wear and loss of efficiency. This is particularly the case where the belt is susceptible to oil contamination. Although metal belts may be used, excessive wear and noise are an undesirable by-product of this substitution.

One prior art system, identified as a belt drive continuously variable transmission produced by Van Doorne Transmissie of Holland, provides variable effective diameter pulleys mounted on a driving and driven shaft. The pulleys have movable pulley halves which separate and close to change their effective diameters for an endless belt encircled therearound. To vary the "gearing" ratio between the drive and driven shafts from a low to high "gear", the drive pulley closes, forcing the belt to move higher in the effective V-shaped pulley groove. Simultaneously therewith, the driven pulley opens, permitting the belt to ride lower in the pulley groove, thus increasing gearing.

The use of variable effective diameter pulleys in variable speed transmissions is also shown in the transmissions disclosed in U.S. Pat. Nos. 3,214,997 and 2,970,493 to Rieser, U.S. Pat. No. 3,287,988 to Heyer and U.S. Pat. No. 3,924,480 to Carapellucci. In each of these arrangements, variable effective diameter pulleys are used with a continuous belt for engaging the pulleys in a similar fashion. Generally, the effective diameter of one pulley is increased while the effective diameter of the other is decreased to compensate for belt length. In one embodiment of the transmission disclosed in the reference to Rieser, U.S. Pat. No. 3,214,997, one variable effective diameter pulley is disclosed with belt tension being compensated for by movement of the pulley relative to the fixed diameter pulley.

DISCLOSURE OF INVENTION

The present invention provides an improved variable ratio transmission which overcomes many of the disadvantages heretofore experienced by prior art units. In accordance with one embodiment of the invention, the variable speed transmission provides a drive sprocket rotatably supported on a first shaft. A variable effective diameter pulley assembly is mounted for rotation with a second shaft. An endless chain-belt assembly, designed for engagement with both the sprocket and variable effective diameter pulley, is encompassed around both the transmit rotation between the first and second shafts.

In accordance with a further embodiment of the invention, the chain-belt assembly used in the present invention has a first portion defining the edges for engagement with the variable effective diameter pulley and a second portion intermediate of the first portion for engaging the sprocket. As a result of this embodiment, positive engagement with the sprocket is provided while permitting transmission of power to the variable effective diameter pulley.

In accordance with a more specific embodiment of the invention, the first portion of the chain-belt assembly includes a plurality of links forming the edge of the belt assembly which define the surface corresponding to opposed inclined belt engaging surfaces on the pulley. A plurality of toothed chain links for engaging the teeth of the sprocket are mounted intermediate of the links on the edge of the chain-belt assembly.

In accordance with still a further embodiment of the invention, the variable effective diameter pulley assembly comprises a pair of pulley halves having opposed inclined belt engaging surfaces with interengaging complimentary splines extending inwardly therefrom. The splines permit the varying of the effective diameter of the pulley assembly as the pulley halves more relative one to the other to change the effective diameter on the pulley assembly engaged by the chain-belt assembly. The interengagement of the pulley splines provide positive support resulting in stabilizing the pulley halves uniformly with one another.

A split shaft assembly, including two half shafts, extends within the pulley halves. Each half shaft engages one of the pulley halves such that as the half shafts of the split shaft assembly are moved relative to one another, the pulley halves are moved one relative to the other. Means is provided for actuating the halves of the split shaft simultaneously such that the center line of the pulley assembly remains fixed as the pulley halves more together or apart.

In accordance with still a further embodiment of the invention, a first bearing is mounted between the split shaft and the first pulley half and a second bearing is mounted between the split shaft and a second pulley half. A first thrust washer is keyed to one of the halves of the split shaft for engaging the first bearing means and a second thrust washer is keyed to the other of the halves of the split shaft for engaging the second bearing means. Upon movement of the halves of the split shaft, the thrust washers engage the bearing means to move the pulley halves and thereby vary the effective diameter of the pulley.

In accordance with still a further embodiment of the invention, a first rack is attached on the end of one of the halves of the split shaft and a second rack is attached on the end of the other split shaft half. A first control gear is mounted for engagement with the first rack and a second control gear is mounted for engagement with the second rack. A connecting rod is attached between the first and second control gears for simultaneous and opposite movement of the first and second control gears. The halves of the split shaft are translated equally and in opposite directions by movement of the connecting rod thereby effecting equal and opposite movement of the pulley halves.

In accordance with still a further embodiment of the present invention, a hollow driven shaft is received within the splines of the pulley halves and is slidably keyed thereto such that rotation of the pulley is transmitted to the driven shaft. This arrangement permits sliding of the pulley halves relative to the driven shaft by engagement of the split shaft assembly received within the hollow driven shaft.

In accordance with still a further embodiment of the invention, an idler pulley is mounted relative to the variable effective diameter pulley assembly and sprocket with the chain assembly encircled therearound. The idler pulley is moved in conjunction with the opening and closing of the variable diameter pulley assembly to remove slack by tensioning the chain-belt assembly as the effective diameter of the pulley is varied.

The effective diameter of the pulley assembly, and thus the variation of the drive ratio of the present transmission, is operated by a control mechanism for rotating the first and second control gears. By rotating the control gears, the halves of the split shaft are moved to separate or draw together the confronting pulley halves. In low gear, the pulley halves are drawn together giving the maximum radius of belt travel. Shifting to higher gears is achieved, in continuous increments as needed, by permitting the separation of the pulley halves and the movement of the chain assembly to a lower periphery on the pulley assembly. Tension on the chain-belt assembly is maintained by the idler pulley which is mounted for movement relative to the chain-belt assembly. In one embodiment of the invention, the idler pulley is mounted on a pivoting arm and is moved either by being spring loaded and/or by the use of a pneumatic cylinder operated to apply a tensioning force to the pivoting arm.

BRIEF DESCRIPTION OF THE DRAWINGS

For a more complete understanding of the present invention, and for further details and advantages thereof, reference is now made to the following description taken in conjunction with the accompanying drawings, in which.

DESCRIPTION OF THE PREFERRED EMBODIMENT

Figure 1:
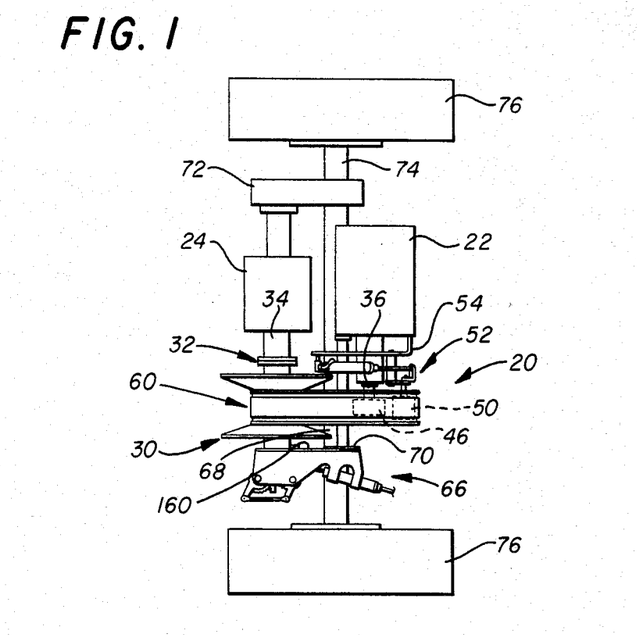
FIG. 1 is a plan view of the transmission of the present invention mounted between an engine and differential of a wheeled vehicle.

FIG. 1 illustrates the variable ratio transmission 20 according to the present invention mounted in relation to an engine 22 and a differential 24. Transmission 20 includes a variable effective diameter pulley assembly 30 rotatably mounted on a hollow shaft 32. Shaft 32 is connected by an appropriate flange to shaft 34 extending from differential 24. A drive shaft 36 extends from engine 22 and includes a drive sprocket 46 mounted on the end thereof. An idler pulley 50 is supported by an idler pulley actuation mechanism 52 from a support 54. An endless chain-belt assembly 60 is encompassed around pulley assembly 30, drive sprocket 46 and idler pulley 50. A pulley control mechanism 66 is attached by a support 68 from support plate 70. As will be described hereinafter in greater detail, control mechanism 66 operates to change the effective diameter of the pulley assembly 30, as ratio change is necessary, while idler pulley 50 is moved by idler pulley actuation mechanism 52 to maintain tension in chain-belt assembly 60.

Referring still to FIG. 1, power from differential 24 is transmitted through an appropriate drive assembly 72 to axle 74 to drive wheels 76. Although the illustration in FIG. 1 illustrates either a front engine-front wheel drive arrangement or a rear engine-rear drive arrangement, it will be understood that the present invention may likewise be used for a front engine-rear wheel drive or rear engine-front wheel drive arrangement by merely incorporating a drive shaft as is well known in the art. Likewise, as will become apparent from the following description of the present invention, other arrangements are made possible by the particular transmission disclosed herein.

Figure 2:
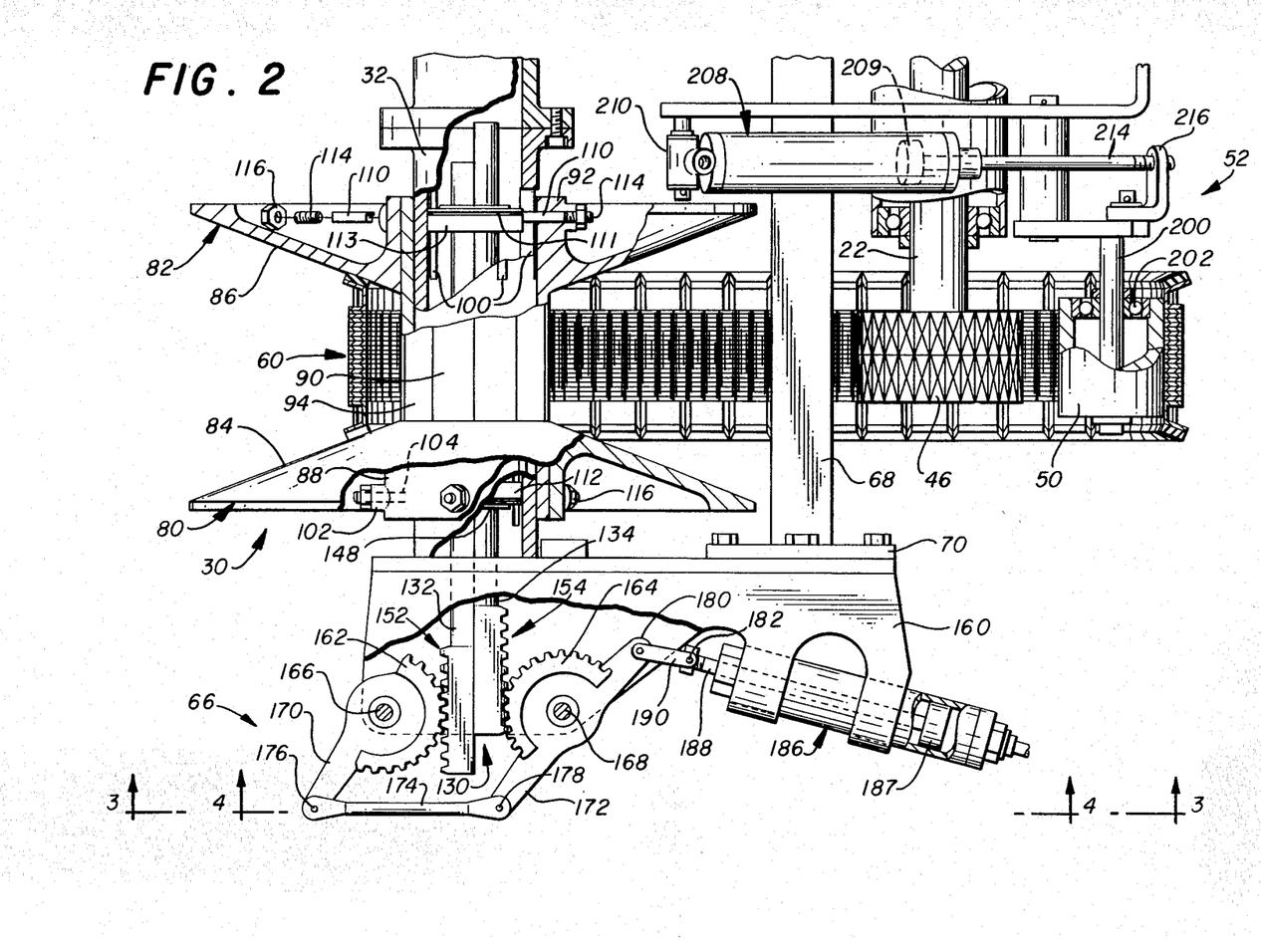
FIG. 2 is a partially broken away top view of the transmission of the present invention.
Figures 3, 4:
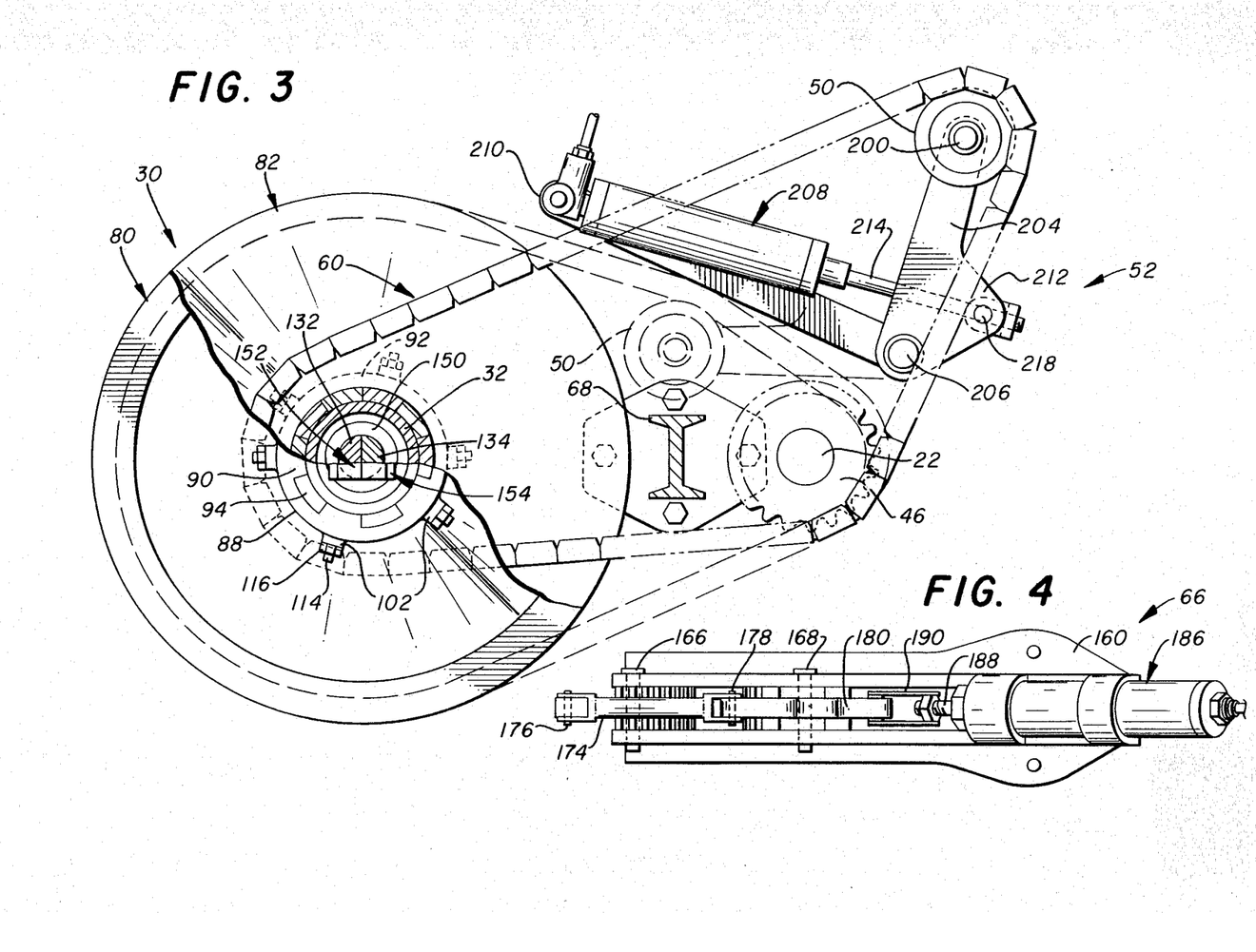
FIG. 3 is a side plan view of the variable transmission of the present invention as seen from along line 3—3 of FIG. 2.
FIG. 4 is a side view showing the variable pulley control mechanism of the present invention as seen from along line 4—4 of FIG. 2.

Transmission 20 is shown in greater detail in FIGS. 2, 3 and 4. Driven pulley assembly 30, shown exploded in FIG. 5, includes pulley halves 80 and 82, each having belt engaging inclined surfaces 84 and 86, respectively. Pulley half 80 has a hub 88 extending therefrom and interiorly extending splines 90. Similarly, pulley half 82 has a hub 92 extending therefrom and interiorly extending splines 94 which intermesh with splines 90 of pulley half 80. The splines of pulley halves 80 and 82 mesh one with the other to permit sliding relationship therebetween while assuring rotation of one pulley half with the other. Driven shaft 32 is received within splines 90 and 94 and supports pulley assembly 30 thereon. Driven shaft 32, shown in detail in FIG. 6, has a plurality of slots 100 formed therein along the longitudinal length thereof.

Figure 5:
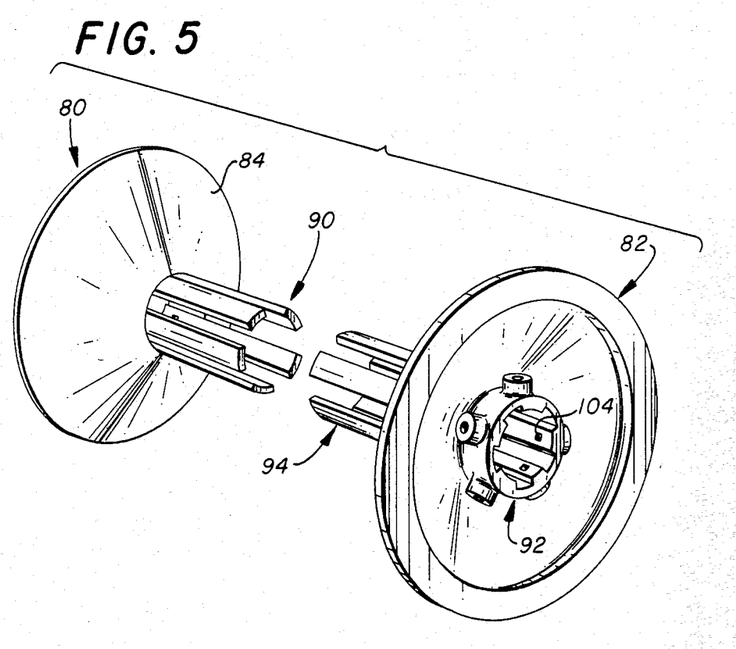
FIG. 5 is a perspective exploded view showing the halves of the variable effective diameter pulley used in the present invention.
Figures 6, 7:
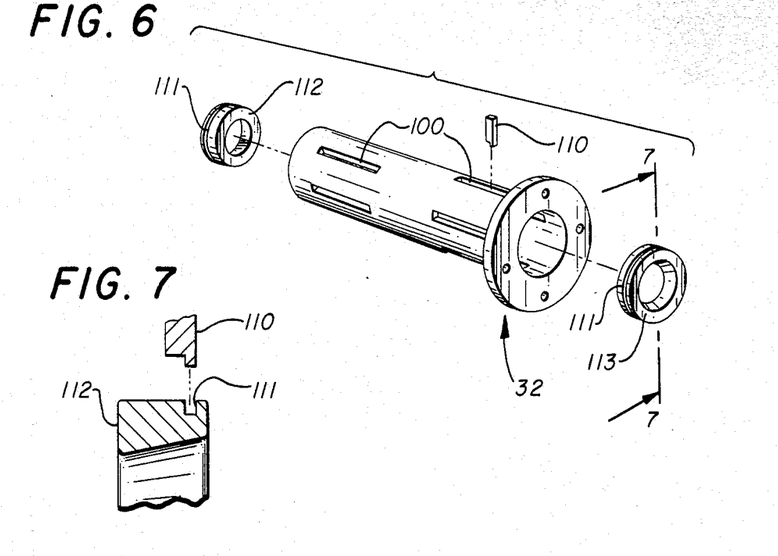
FIG. 6 is a perspective exploded view showing the driven shaft, the bearing assembly outer race and keys which permits sliding engagement between the bearing race and shaft.
FIG. 7 is a section view taken along line 7—7 of FIG. 6.

A plurality of bosses 102 are formed on hubs 88 and 92 of pulley halves 80 and 82 (FIGS. 2, 3 and 5). Radial slots 104 are formed within each boss 102 through hubs 88 and 92. Keys 110 are received within radial slots 104 and are aligned for engagement through slots 100 in driven shaft 32 thereby connecting the pulley halves slidably thereto. Keys 110 engage indentions 111 in an outer bearing races 112 and 113 (FIGS. 6 and 7) thereby positioning the race relative to pulley halves 80 and 82. Referring to FIG. 2, set screws 114 are received within upper threaded portions of slots 104 in bosses 102. A lock nut 116 is mounted on set screws 114 and advanced against bosses 102 to lock set screws 114 relative to hubs 88 and 92. It will be appreciated that pulley halves 80 and 82 are slidable relative to driven shaft 32 while being locked for rotation therewith by keys 110.

Figure 8:
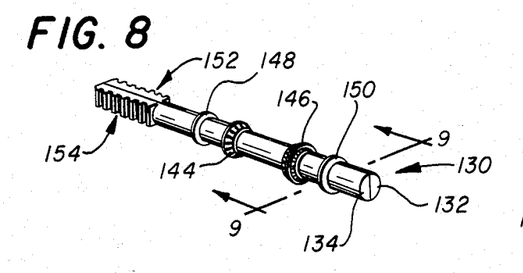
FIG. 8 is a perspective view of the split shaft and bearing assembly which control the variable pulley of the present invention.
Figure 9:
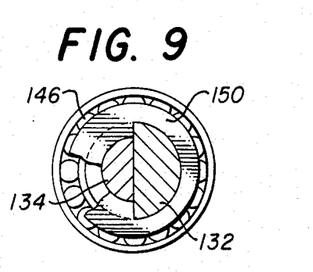
FIG. 9 is a section view taken along line 9—9 of FIG. 8.
Figure 10:
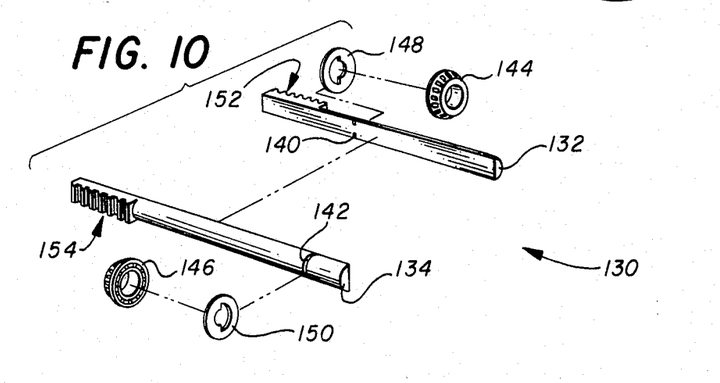
FIG. 10 is an exploded view of the split shaft and bearing assembly illustrated in FIG. 8.

Referring to FIGS. 2, 3 and 4, pulley control mechanism 66 includes a split shaft assembly 130 having a first half shaft 132 and a second opposite half shaft 134. As can be seen in FIGS. 8, 9 and 10, wherein split shaft assembly 130 is shown removed from pulley assembly 30, half shaft 132 has semicircular grooved slots 140 cut therein. Shaft half 134 has similar slots 142 cut therein. In their assembled position, illustrated in FIG. 8, shaft halves 132 and 134 receive thrust bearings 144 and 146 thereon. Bearings 144 and 146 are retained in position on half shafts 132 and 134 within thrust washers 148 and 150 which are mounted on opposite ends of shaft assembly 130 by engagement in slots 140 and 142, respectively. Thrust washer 148 prevents the outward movement of bearing 144 and thrust washer 150 prevents the outward movement of bearing 146. A rack 152 is attached on the end of shaft half 132, and a rack 154 is attached on the end of shaft half 134.

Referring now to FIGS. 2 and 4, pulley control mechanism 66 further includes a support frame 160 pivotally supporting control gears 162 and 164. Gears 162 and 164 mesh with racks 152 and 154, respectively, and rotate about pins 166 and 168. Gears 162 and 164 have arm extensions 170 and 172, respectively, extending therefrom. A connecting rod 174 joins the upper ends of arm extensions 170 and 172 by connection thereto through pins 176 and 178, causing gears 162 and 164 to move in unison.

Gear 164 has an arm extension 180 opposite extension 172. An actuation cylinder 186 is mounted from support 160 and has a piston 187 connecting piston rod 188 extending therefrom. The end of piston rod 188 is connected by an appropriate connection 190 to extension arm 180 through aperture 182. As can now be appreciated, by extending piston rod 188, control gears 162 and 164 are rotated. As viewed in FIG. 2, piston rod 188 is in a high gear position. Pressure applied to piston 187 extends piston rod 188, thus rotating the gear faces of gears 162 and 164 in opposite directions. As half shaft 132 moves inwardly, thrust washer 150 also moves inwardly and as half shaft 134 moves inwardly, thrust washer 148 attached thereto moves inwardly proportionally to the centerline of the pulley assembly. As a result, thrust washers 148 and 150 engage their respective bearings 144 and 146 which in turn engage outer bearing races 112 and 113 attached respectively to pulley halves 80 and 82. In this way, pulley halves 80 and 82 are drawn together as a result of the extension of piston rod 188 of actuation cylinder 186. Correspondingly, by the retraction of piston rod 188, pulley halves 80 and 82 are permitted to separate.

As is also shown in FIG. 2, support frame 160 is mounted relative to pulley assembly 30 from support 68 by support plate 70 also illustrated in FIG. 1.

As will now be appreciated, as the pulley halves 80 and 82 are drawn together, the effective diameter of the pulley is increased as a result of the constant width chain-belt assembly 60 being caused to ride higher on inclined surfaces 84 and 86 of pulley halves 80 and 82, respectively, resulting in the downshifting of the driven shaft to a lower gear ratio. Correspondingly, from low gear position, as the pulley halves are allowed to separate, the effective diameter of pulley assembly 30 is decreased as a result of chain-belt assembly 60 being permitted to ride lower on inclined surfaces 84 and 86 of pulley halves 80 and 82, respectively. Similarly, the longitudinal axis alignment of the belt is not altered as a result of the movement of the pulley halves 80 and 82 one from the other in that the pulley halves move simultaneously and in equal increments from a plane through the centerline of chain-belt assembly 60.

Referring now to FIGS. 2 and 3, idler pulley 50 is mounted for free rotation on bearings 202 on a shaft 200. Idler pulley 50 is supported on a pivotable arm 204 mounted for rotation on a shaft 206. The actuation mechanism 52 includes actuation cylinder 208 mounted between a fixed support 210 and an extension 216 connecting tensioner arm 204. Actuation cylinder 208, being controlled by piston 209, connects an extendable piston rod 214 having its end mounted to an extension 216 (FIG. 2) pivotally attached to tensioner arm 204 by an appropriate pin 218. By applying pressure to the actuation cylinder 208, tensioner arm 204 is moved outwardly, thereby removing any slack and producing constant tension on the chain-belt assembly 60 as necessary. As the pulley halves 80 and 82 separate to permit chain-belt assembly 60 to ride lower within pulley assembly 30, the extra slack in chain-belt assembly 60 is taken up by the idler pulley through the actuation mechanism 52. By applying a desired constant pressure to actuation cylinder 208, pressure may be communicated through actuation mechanism 52 and thus a constant tension may be maintained on chain-belt assembly 60.

Figure 11:
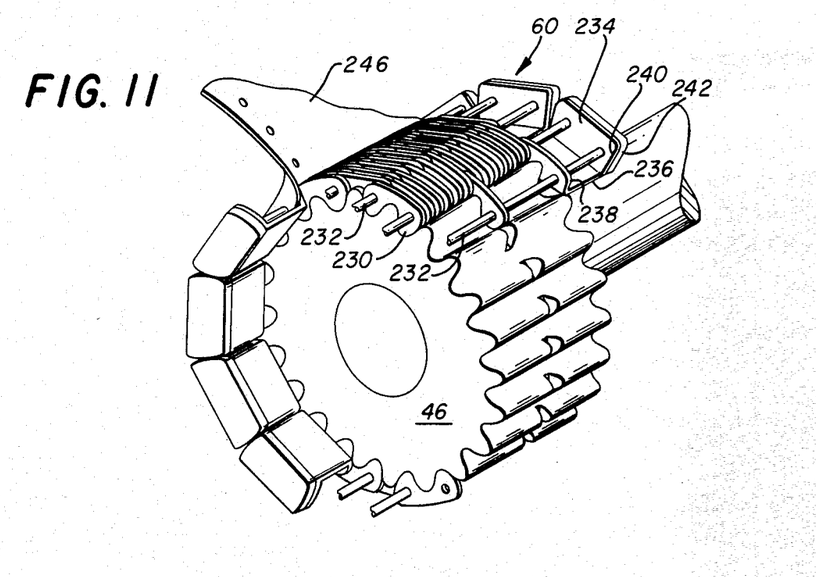
FIG. 11 is a perspective view showing the engagement of the chain-belt assembly to the drive sprocket in the transmission of the present invention with the cover of the chain assembly peeled back to better illustrate the structure of the chain assembly.
Figure 12:
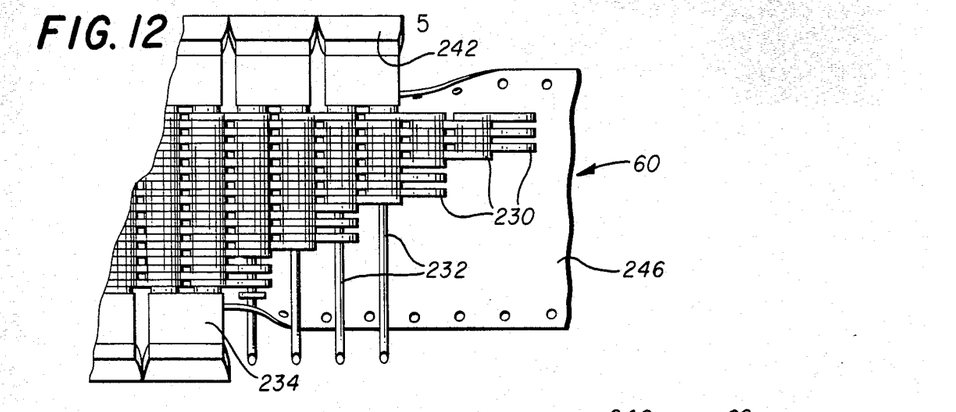
FIG. 12 is a bottom view of the chain-belt assembly used in the present invention partially disassembled to better illustrate the structure thereof.
Figure 13:
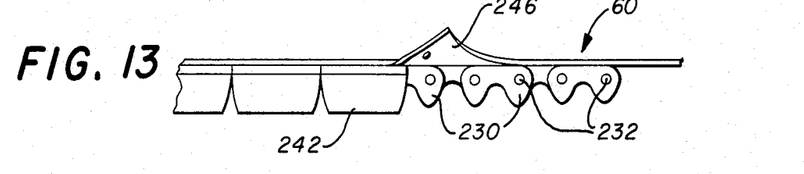
FIG. 13 is a partially broken away side view of the chain assembly used in the present invention.

Referring now to FIGS. 11–13, chain-belt assembly 60 is a unique silent chain-belt arrangement permitting the transmission of power between toothed drive sprocket 46 and pulley assembly 30 having provisions for engagement by both. Chain-belt assembly 60 is composed of a plurality of tooth-like engaging chain links 230 joined by a plurality of pins 232. Pins 232 extend to both sides of teeth engaging chain links 230 and receive a plurality of substantially U-shaped belt links 234. Links 234 comprise a perpendicular base 236 with an upstanding arm extension 238 adjacent links 230. An inclined outstanding arm 240 extends from base 236 opposite arm 238 and angles outwardly, substantially corresponding to the inclined surface of surfaces 84 and 86 of pulley halves 80 and 82, respectively. A tractive pad 242 is attached to the outwardly facing surface of arm 240 and is made of suitable wear resistant material. Pads 242 engage inclined surfaces 84 and 86 of pulley halves 80 and 82, respectively, to transmit power from chain-belt assembly 60 to pulley assembly 30. A flexible cover 246, shown partially stripped back in FIGS. 11–13 for clarity, is mounted over links 230 and retained in place by engagement of pins 232 therethrough. Cover 246 serves to retain an appropriate lubricant adjacent links 230 as needed to provide lubrication to the intermediate portion of the belt which engages drive sprocket 46 and to provide protection to the same from contamination by foreign debris.

Thus, the present invention provides a chain-belt combination which has an intermediate section consisting of a modified silent type chain positively engaging a toothed sprocket rotably driving therein while incorporating link sections forming the sides, adjacent to the intermediate portion of the chain-belt assembly. The belt links provide a positive engagement with the driven pulley assembly by the engagement of the belt links against the compatible inclined surface of the variable effective diameter pulley assembly. Thus, the efficient strength and rigid support of a chain is combined with the tractive grip of a belt.

Referring to FIGS. 2 and 3, the transmission of the present invention is shown in higher gear in that pulley halves 80 and 82 are separated to provide a smaller effectual diameter relative to the belt, thus decreasing the ratio between drive sprocket 46 and pulley assembly 30. When actuation cylinder 186 is activated to extend piston rod 188, control gears 162 and 164 are rotated to draw half shafts 132 and 134 inwardly, thereby causing the pulley halves 80 and 82 to be drawn together. Consequently, chain-belt assembly 60 is caused to move up inclined surfaces 84 and 86 to a relatively larger diameter, thereby increasing the drive ratio between drive shaft 22 and driven shaft 32. Low gear is achieved when pulley assembly 30 is in its closed position. This position is shown by phantom lines in FIG. 3. Actuation cylinder 186 may be controlled by various sources, such as manual control, hydraulically controlled, and/or electronic speed control sensors responsive to various power demands relative to appropriate gearing conditions. These methods of controlling actuation cylinder 186 are presented only as examples in that the control of cylinder 186 may be achieved by any number of possibilities, each of which is considered to be within the scope of the present invention.

Corresponding to the actuation of cylinder 186, idler pulley actuation mechanism operates to engage idler pulley 50 against chain-belt assembly 60 to maintain either a constant or a programmed variable tension on the belt as desired. Again, control of actuation cylinder 208 of the idler pulley actuation mechanism 52 may be in accordance with any number of parameters, one of which is to maintain a constant pressure thereon, thereby maintaining a substantially constant pneumatic tension on chain-belt assembly 60.

Therefore, the present invention provides a variable ratio transmission using a variable effective diameter pulley assembly driven by and coupled to a drive sprocket by unique chain belt structure. The pulley assembly includes two identical halves having inclined belt confronting surfaces and interlinked with splines which permit the pulley halves to move together or apart yet rotate as a unit. A unique chain-belt assembly transmits power between a drive sprocket and the pulley assembly and includes an outer portion having inclined surfaces for cooperating with the inclined surfaces of the pulley halves and an intermediate section for engaging the teeth of the drive sprocket.

The relative distance between the pulley halves is controlled by a shifting apparatus permitting the variation of the effective diameter of the pulley, thereby permitting the variation of the gear ratio between the drive sprocket and the driven pulley assembly. In low gear, the pulley halves are drawn together to effect a relatively large pulley diameter. Shifting to higher gearing is achieved in continuous increments, as needed, by permitting the pulley halves to move apart, thereby reducing the effective diameter of the driven pulley with which the belt assembly makes contact. The belt tension is maintained by an idler sprocket mounted on a pivoting arm, constantly pressured to eliminate any slack in the belt. In one embodiment, the arm is pivoted by a pressurized pneumatic cylinder. Alternatively, a spring actuated tensioner may be incorporated in the system, or both actuating means connected in unison.

Figures 14, 15, 16:
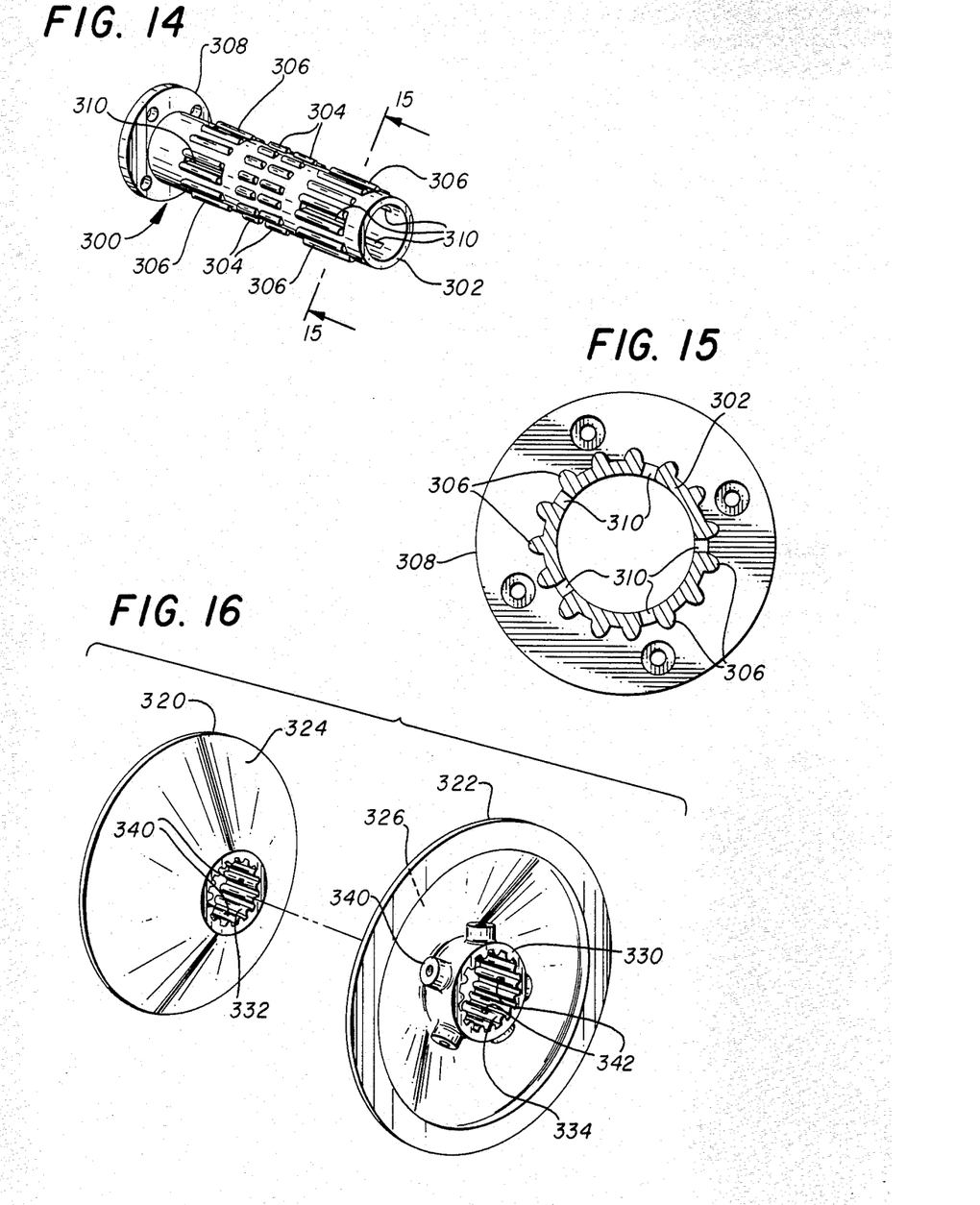
FIG. 14 is a perspective view of an alternative driven shaft used in the present invention.
FIG. 15 is a section view taken along line 15—15 of FIG. 14.
FIG. 16 is a perspective view of the variable effective diameter pulley halves used in an alternative embodiment of the present invention.

An alternative design for pulley halves 80 and 82 and hollow shaft 32 is illustrated in FIGS. 14, 15 and 16. Referring to these FIGURES, a hollow shaft 300 replaces shaft 32 illustrated in FIGS. 1, 2, 3 and 6. Shaft 300 includes a main section 302 having a plurality of raised chain-belt assembly engaging sprocket teeth 304 in the central portion of the shaft corresponding to raised pulley engaging splines 306 on opposite sides of teeth 304. A flange 308 is secured to one end of the shaft for attachment to a differential, such as differential 24 shown in FIG. 1. A plurality of slots 310 are formed intermediate of certain of the splines 306 and correspond to slots 100 formed in hollow shaft 32 shown in FIG. 6.

Pulley halves 320 and 322 have an incline chain-belt assembly engaging surface 324 and 326, respectively. Each pulley half has a hub 330 having internal splines 332 and 334 for sliding engagement on splines 306 of shaft 300. As in pulley halves 80 and 82, a plurality of bosses 340 are formed on hub 330 and receive a pin therein similar to pin 110 through slots 342 for engagement through slots 310 of shaft 300 for engagement in the outer races of bearings received within shaft 300 and riding on half shafts, such as half shafts 132 and 134 illustrated in the embodiment of FIGS. 2, 3, 8, 9 and 10.

The alternate embodiment of FIGS. 14-16 provides pulley halves which are more easily manufactured than those illustrated with respect to the first embodiment disclosed. Further, the embodiment also provides for a direct engagement between chain assembly 60 and shaft 300 in the high gear position. Where pulley halves 320 and 322 are permitted to separate allowing the chain assembly to move downwardly on the inclined surface to a lower effective diameter, the higher gear position is reached with the chain-belt assembly engaging the lowermost effective diameter of the pulley assembly. As the chain assembly moves to this lowermost position on the pulley assembly, teeth engaging chain links 230 will engage teeth 304 of shaft 300. This engagement effects a positive engagement between chain-belt assembly 60 and shaft 300. This positive engagement eliminates the possibility of slippage in the high gear position while permitting the variable ratio transmission 20 to operate as described with respect to the embodiment illustrated in FIGS. 1-13 in all other ratio positions.

This arrangement effectively reduces wear on the belt assembly in that in the high gear positions, the positive engagement between the belt assembly and the pulley assembly eliminates the traction between pads 242 and the inclined surfaces of the pulley halves.

In this embodiment, the rotation of pulley halves 320 and 322 is transmitted to shaft 300 by way of engagement between splines 306 of shaft 300 and splines 332 and 334 of the pulley halves. This arrangement provides an effective design for transmitting rotation forces between the pulley halves and the shaft while allowing sliding therebetween.

Thus, the present invention provides a transmission unit permitting the gradual transmission of mechanical energy from a drive shaft to a driven shaft with minimal power losses and having an absolute spectrum of ratios to maximize available power and minimize waste due to improper gearing. The present transmission provides more flexibility permitting utilization of available torque and reducing frictional losses resulting in power gains when compared to conventional transmission units. The present transmission will result in the relief of stresses on engines and drive parts, as well as the lowering of emission levels by permitting the engine to operate at a more constant operating speed. Pollutant emissions will also be lowered by the elimination of shift lag or abrupt gear changes associated with both standard and automatic transmissions presently in use.

The present transmission also provides a unit which is simplified in construction and requires only limited space requirements. The unit is readily adaptable because of the simplicity of the unit; thus, assembly and maintenance is reduced as well as lowered production costs.

The present transmission arrangement also incorporates the adjustable pulley assembly on the driven shaft, thereby providing more belt traction as the greatest area of effective pulley surface makes contact with the belt surface during low gear ratios where more demand is prevalent. This arrangement, under peak load conditions, provides inherent ease in shifting to higher ratios. Specifically, as the pulley halves are permitted to slide apart during ratio change, the belt moves inwardly to a smaller effective diameter within the variable pulley with little resistance. Under conditions of gear reduction to a lower gear ratio, the pulley halves are adjusted together to force the belt to a larger circumference on the pulley's periphery. Wear is more prevalent when reducing to a lower ratio as the belt must be forced to a larger circumference; however, little load is aplied during down shifting. Most load occurs during conditions of acceleration, that is, with shifting movement from a lower to a higher gear ratio.

The present invention also provides a novel belt arrangement which permits the connection of a drive sprocket mounted to the drive shaft with a variable diameter pulley mounted for rotation with a driven shaft. The silent-type chain-belt arrangement incorporated in the present invention provides links defining the edge thereof for engagement with the inclined wall surfaces of the variable pulley and toothed links intermediate of the edges of the belt for a positive engagement with the drive sprocket.

The present invention also provides a simplified means for controlling the effective diameter of the pulley by providing pulley halves which rotate as the control mechanism remains stationary. As has been described, the pulley halves are controlled by a split shaft with halves which operate in unison in opposite directions being controlled by a common mechanism. As a result, the pulley center line is aligned with the belt and sprocket throughout all transmission ratios assuring better traction and wear.

In the alternative embodiment illustrated in FIGS. 14–16, the present invention also provides for positive engagement between the chain-belt assembly and the hollow shaft in the high gear position. This arrangement eliminates slippage between the chain assembly and the variable pulley, as well as reduces wear on the chain-belt assembly.

Although preferred embodiments of the invention have been described in the foregoing Detailed Description and illustrated in the accompanying Drawings, it will be understood that the invention is not limited to the embodiments disclosed but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

What is claimed is:

1. A variable speed transmission for transmitting rotational forces between a first shaft and a second shaft comprising:

chain-belt engagement means communicating with the first shaft;

a variable effective diameter pulley communicating with the second shaft, said pulley comprising a pair of pulley halves having opposed inclined belt engaging faces and a centerline defined by a plane between the pulley halves and equally spaced therefrom, said pulley halves further having a continuous belt engaging surface;

means for varying the effective diameter of said pulley comprising a split shaft having two half shafts extending within said pulley, each half shaft engaging one of said pulley halves such that as said half shafts of said split shaft are moved relative to one another, said pulley halves are moved one relative to the other, and controls for engaging the exterior of each shaft half for moving said half shafts of the split shaft simultaneously such that the center line of said pulley remains fixed as said pulley halves move together or apart; and an endless chain-belt assembly encompassing said chain-belt engagement means and the variable effective diameter pulley to transmit rotation between the first and second shafts.

2. The variable speed transmission according to claim 1 wherein said endless chain-belt assembly has a first portion defining its edges for engagement with the variable effective diameter pulley and a second portion intermediate of the first portion for engaging said chain belt engagement means.

3. The variable speed transmission according to claim 2 wherein said first portion on said endless chain-belt assembly is a plurality of links on the edge of said chain-belt assembly and defining a surface corresponding to opposed inclined chain-belt engaging faces on said pulley and said second portion is a plurality of links for engaging said sprocket.

4. A variable speed transmission according to claim 1 further comprising:

idler means for tensioning said chain-belt assembly on change of the effective diameter of said pulley.

5. The variable speed transmission according to claim 1 wherein said pulley includes splines extending from the continuous belt engaging surface of said pulley halves and intermeshing one with the other so that said pulley halves rotate uniformly with one another, said splines being slidably movable adjacent an inner hollow shaft for receiving said half shafts;

and wherein said means for moving said pulley halves includes a split shaft having two half shafts extending within said pulley, each half shaft engaging one of said pulley halves such that as said half shafts of said split shaft are moved relative to one another, said pulley halves are moved one relative to the other; and means for moving said half shafts of the split shaft simultaneously such that the center line of said pulley remains fixed as said pulley halves move together or apart.

6. The variable speed transmission according to claim 5 further comprising:

hub sections attached to said pulley halves and having spline-receiving grooves therein for receiving the splines extending from the adjacent pulley half.

7. The variable speed transmission according to claim 1 further comprising:

a driven shaft received within said pulley halves and slidably keyed thereto such that rotation of said pulley halves is transmitted to said driven shaft while permitting sliding of the pulley halves relative to the driven shaft.

8. The variable speed transmission according to claim 1 further comprising:

a driven shaft having splines thereon for slidable engagement with said pulley halves and for engagement with said endless chain-belt assembly when said pulley halves are separated to permit engagement of the chain assembly with the driven shaft.

9. A variable speed transmission according to claim 1 wherein said control for engaging the exterior of each half shaft is fixed for non-rotation with said pulley and wherein said shaft halves are journally supported to one side of said pulley by said controls for engaging the exterior of each said half shaft.

10. The variable speed transmission according to claim 1 further comprising:

a tensioning arm lever for pivoting a tensioning roller against the inner surface of said chain belt.

11. A variable speed transmission for transmitting rotational forces between a first shaft and a second shaft comprising:

chain-belt engagement means communicating with the first shaft;

a variable effective diameter pulley communicating with the second shaft means, said pulley comprising a pair of pulley halves having opposed inclined belt engaging faces;

means for varying the effective diameter of said pulley comprising means for moving said pulley halves simultaneously toward or away from one another such that the center line of said pulley remains fixed as said pulley halves move together or apart; and an endless chain-belt assembly encompassing said chain-belt engagement means and the variable effective diameter pulley to transmit rotation between the first and second shafts;

wherein said pulley includes splines extending from said pulley halves and intermeshing one with the other so that said pulley halves rotate uniformly with one another, and wherein said means for moving said pulley halves includes a split shaft having two half shafts extending within said pulley, each half shaft engaging one of said pulley halves such that as said half shafts of said split shaft are moved relative to one another, said pulley halves are moved one relative to the other;

means for moving said half shafts of the split shaft simultaneously such that the center line of said pulley remains fixed as said pulley halves move together or apart wherein said means for moving said pulley halves further comprises a first bearing means mounted between said split shaft and said first pulley half and a second bearing means mounted between said split shaft and said second pulley half; and a first thrust washer keyed to one of the half shafts of said split shaft for engaging said first bearing means and a second thrust washer keyed to the other of the half shafts of said split shaft for engaging said second bearing means upon movement of said half shafts of said split shaft to vary the diameter of said pulley.

12. A variable speed transmission for transmitting rotational forces between a first shaft and a second shaft comprising:

chain-belt engagement means communicating with the first shaft;

a variable effective diameter pulley communicating with the second shaft, said pulley comprising a pair of pulley halves having opposed inclined belt engaging faces;

means for varying the effective diameter of said pulley comprising means for moving said pulley halves simultaneously toward or away from one another such that the center line of said pulley remains fixed as said pulley halves move together or apart; and an endless chain-belt assembly encompassing said chain-belt engagement means and the variable effective diameter pulley to transmit rotation between the first and second shafts;

wherein said pulley includes splines extending from said pulley halves and intermeshing one with the other so that said pulley halves rotate uniformly with one another;

and wherein said means for moving said pulley halves includes a split shaft having two half shafts extending within said pulley, each half shaft engaging one of said pulley halves such that as said half shafts of said split shaft are moved relative to one another, said pulley halves are moved one relative to the other;

means for moving said half shafts of the split shaft simultaneously such that the center line of said pulley remains fixed as said pulley halves move together or apart;

a first rack means mounted on the end of one of the half shafts of said split shaft and a second rack means mounted on the end of the other half of the half shafts;

a first control gear mounted for engagement with said first rack means and a second control gear mounted for engagement with said second rack means; and a connecting rod attached between said first and second control gears for simultaneous and opposite movement of said first and second control gears to translate the half shafts of said split shaft equally and in opposite directions by the movement of the connecting rod.

13. A variable speed transmission comprising:

a sprocket mounted on a first shaft for rotation therewith;

a variable effective diameter pulley mounted for rotation on a driven shaft and slidably keyed thereto for transmitting rotational forces from said pulley to said shaft, said pulley including a pair of pulley halves having opposed inclined continuous chain-belt engaging surfaces and splines extending from said pulley halves and interconnected one with the other so that said pulley halves rotate together while permitting said pulley halves to slide relative to said shaft;

means mounted within said driven shaft for engaging said pulley halves to move said pulley halves one relative to the other to thereby change the effective diameter of the pulley including a split shaft having two half shafts extending within said pulley, each half shaft engaging one of said pulley halves such that as said half shafts of said split shaft are moved relative to one another, and controls for engaging the exterior of each shaft half for moving said half shafts of the split shaft simultaneously such that the center line of said pulley remains fixed as said pulley halves move together or apart; and an endless chain-belt assembly encompassed around the sprocket and the variable effective diameter pulley to transmit rotation therebetween.

14. The variable speed transmission according to claim 13 wherein said endless chain assembly has a first portion defining its edges for engagement with the variable effective diameter pulley and a second portion intermediate of the first portion for engaging said sprocket.

15. The variable speed transmission according to claim 14 wherein said first portion on said endless chain-belt assembly is a plurality of links on the edge of said assembly and defining a surface corresponding to opposed inclined belt engaging faces on said pulley and said second portion is a plurality of links for engaging said sprocket.

16. A variable speed transmission according to claim 13 further comprising:
idler means for tensioning said chain-belt assembly upon change of the effective diameter of said pulley.

17. The variable speed transmission according to claim 13 wherein said means for engaging said pulley halves includes a split shaft having two half shafts extending within said pulley, each half shaft engaging one of said pulley halves such that as said shaft halves of said split shaft are moved relative to one another, said pulley halves are moved one relative to the other; and
means for moving said halves of the split shaft simultaneously such that the center line of said pulley remains fixed as said pulley halves move together or apart.

18. A variable speed transmission according to claim 13 wherein said control for engaging the exterior of each half shaft is fixed for non-rotation with said pulley and wherein said shaft halves are journally supported to one side of said pulley by said controls for engaging the exterior of each said half shaft.

19. A variable speed transmission comprising:
a sprocket mounted on a first shaft for rotation therewith;
a variable effective diameter pulley mounted for rotation on a driven shaft, said pulley including a pair of pulley halves having opposed inclined chain-belt engaging surfaces and splines extending from said pulley halves and interconnected one with the other so that said pulley halves rotate together;
means mounted within said driven shaft for engaging said pulley halves to move said pulley halves one relative to the other to thereby change the effective diameter of the pulley; and
an endless chain-belt assembly encompassed around the sprocket and the variable effective diameter pulley to transmit rotation therebetween;
wherein said means for engaging said pulley halves includes a split shaft having two half shafts extending within said pulley, each half shaft engaging one of said pulley halves such that as said shaft halves of said split shaft are moved relative to one another, said pulley halves are moved one relative to the other; and means for moving said halves of the split shaft simultaneously such that the center line of said pulley remains fixed as said pulley halves move together or apart;
wherein said means for engaging said pulley halves further comprises a first bearing means mounted between said split shaft and said first pulley half and a second bearing means mounted between said split shaft and said second pulley half; and a first thrust washer keyed to one of the halves of said split shaft for engaging said first bearing means and a second thrust washer keyed to the other of the halves of said split shaft for engaging said second bearing means upon movement of said halves of said split shaft to vary the diameter of said pulley.

20. A variable speed transmission comprising:
a sprocket mounted on a first shaft for rotation therewith;
a variable effective diameter pulley mounted for rotation on a driven shaft, said pulley including a pair of pulley halves having opposed inclined chain-belt engaging surfaces and splines extending from said pulley halves and interconnected one with the other so that said pulley halves rotate together;
means mounted within said driven shaft for engaging said pulley halves to move said pulley halves one relative to the other to thereby change the effective diameter of the pulley;
an endless chain-belt assembly encompassed around the gear and the variable effective diameter pulley to transmit rotation therebetween;
wherein said means for engaging said pulley halves includes a split shaft having two half shafts extending within said pulley, each half shaft engaging one of said pulley halves such that as said shaft halves of said split shaft are moved relative to one another, said pulley halves are moved one relative to the other; and means for moving said halves of the split shaft simultaneously such that the center line of said pulley remains fixed as said pulley halves move together or apart;
a first rack means attached on the end of one of the halves of said split shaft and a second rack means attached on the end of the other half of the split shaft;
a first control gear attached for engagement with said first rack means and a second control gear attached for engagement with said second rack means; and
a connecting rod attached between said first and second control gears for simultaneous and opposite movement of said first and second control gears to translate the halves of said split shaft equally and in opposite directions by the movement of the connecting rod.

21. A variable speed transmission for transmitting rotational forces between a first shaft and a second shaft comprising:

a sprocket communicating with the first shaft;
a variable effective diameter pulley communicating with the second shaft, said pulley comprising a pair of pulley halves having opposed inclined belt engaging faces with splines extending from said pulley halves and intermeshing one with the other so that said pulley halves rotate uniformly with one another;
an endless chain-belt assembly encompassing the sprocket and the variable effective diameter pulley to transmit rotation between the first and second shafts;
means for varying the effective diameter of said variable pulley to change the ratio of drive between the first and second shafts, said means for varying the effective diameter of said pulley comprising means for moving said pulley halves relative one to the other to vary the diameter at which said pulley halves are engaged by said chain-belt assembly, said means for moving said pulley halves comprising a split shaft having two half shafts extending within said pulley, each half shaft engaging one of said pulley halves such that as said half shafts of said split shaft are moved relative to one another said pulley halves are moved one relative to the other; and
means for moving said half shafts of the split shaft simultaneously such that the center line of said pulley remains fixed as said pulley halves move together or apart, said moving means comprising a first bearing means mounted between said split shaft and said first pulley half and a second bearing means mounted between said split shaft and said second pulley half and a first thrust washer keyed to one of the half shafts of said split shaft for engaging said first bearing means and a second thrust washer keyed to the other of the half shafts of said split shaft for engaging said second bearing means upon movement of said half shafts of said split shaft to vary the effective diameter of said pulley.

22. A variable speed transmission for transmitting rotational forces between a first shaft and a second shaft comprising:
a sprocket communicating with the first shaft;
a variable effective diameter pulley communicating with the second shaft, said pulley comprising a pair of pulley halves having opposed inclined belt engaging faces with splines extending from said pulley halves and intermeshing one with the other so that said pulley halves rotate uniformly with one another;
an endless chain-belt assembly encompassing the sprocket and the variable effective diameter pulley to transmit rotation between the first and second shafts;
means for varying the effective diameter of said variable pulley to change the ratio of drive between the first and second shafts, said means for varying the effective diameter of said pulley and comprising means for moving said pulley halves relative one to the other to vary the diameter at which said pulley halves are engaged by said chain-belt assembly, said means for moving said pulley halves comprising a split shaft having two half shafts extending within said pulley, each half shaft engaging one of said pulley halves such that as said half shafts of said split shaft are moved relative to one another said pulley halves are moved one relative to the other; and
means for moving said half shafts of the split shaft simultaneously such that the center line of said pulley remains fixed as said pulley halves move together or apart, said moving means comprising a first rack means mounted on the end of one of the half shafts of said split shaft and a second rack means mounted on the end of the other half of the half shafts, a first control gear mounted for engagement with said first rack means and a second control gear mounted for engagement with said second rack means, and a connecting rod attached between said first and second control gears for simultaneous and opposite movement of said first and second control gears to translate the half shafts of said split shaft equally and in opposite directions by movement of the connecting rod.

23. A variable speed transmission comprising:
a sprocket mounted on a first shaft for rotation therewith;
a variable effective diameter pulley mounted for rotation on a driven shaft, said pulley comprising a pair of pulley halves having opposed inclined chain-belt engaging surfaces and splines extending from said pulley halves and interconnected one with the other so that said pulley halves rotate together;
means mounted with said driven shaft for engaging said pulley halves to move said pulley halves one said relative to the other to thereby change the effective diameter of the pulley, said means for engaging said pulley halves comprising a split shaft having two half shafts extending within said pulley, each half shaft engaging one of said pulley halves such that as said shaft halves of said split shaft are moved relative to one another, said pulley halves are moved one relative to the other, said means for engaging said pulley halves further comprising a first bearing means mounted between said split shaft and said first pulley half and a second bearing means mounted between said split shaft and said second pulley half, and a first thrust washer keyed to one of the halves of said split shaft for engaging said first bearing means and a second thrust washer keyed to the other of the split halves of said split shaft for engaging said second bearing means upon movement of said halves of said split shaft to vary the effective diameter of said pulley,
means for moving said halves of the split shaft simultaneously such that the center line of said pulley remains fixed as said pulley halves move together or apart; and
an endless chain-belt assembly encompassed around the sprocket and the variable effective diameter pulley to transmit rotation therebetween.

24. A variable speed transmission comprising:
a sprocket mounted on a first shaft for rotation therewith;
a variable effective diameter pulley mounted for rotation on a split shaft having two halves thereto, said pulley comprising a pair of pulley halves having opposed inclined chain-belt engaging surfaces and splines extending from said pulley halves and interconnected one with the other so that said pulley halves rotate together;
means for moving said halves of the split shaft simultaneously such that the center line of said pulley remains fixed as said pulley halves move together or apart; and said moving means comprising a first rack means attached on an end of one of the halves of said split shaft and a second rack means attached on an end of the other half of the split shaft, a first control gear attached for engagement with said first rack means and a second control gear attached for engagement with said second rack means, and a connecting rod attached between said first and second control gears for simultaneous and opposite movement of said first and second control gears to translate the halves of said split shaft equally and in opposite directions by the movement of the connecting rod; and an endless chain-belt assembly encompassed around the sprocket and the variable effective diameter pulley to transmit rotation therebetween.

* * * * *